United States Patent
Inoue et al.

(10) Patent No.: US 10,608,981 B2
(45) Date of Patent: Mar. 31, 2020

(54) NAME IDENTIFICATION DEVICE, NAME IDENTIFICATION METHOD, AND RECORDING MEDIUM

(71) Applicant: NIPPON TELEGRAPH AND TELEPHONE CORPORATION, Chiyoda-ku (JP)

(72) Inventors: Takeru Inoue, Musashino (JP);
Keisuke Ishibashi, Musashino (JP);
Akihiro Shimoda, Musashino (JP);
Kazumichi Sato, Musashino (JP);
Tatsuya Mori, Shinjuku-ku (JP);
Shigeki Goto, Shinjuku-ku (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 291 days.

(21) Appl. No.: 15/546,169

(22) PCT Filed: Feb. 16, 2016

(86) PCT No.: PCT/JP2016/054384
§ 371 (c)(1),
(2) Date: Jul. 25, 2017

(87) PCT Pub. No.: WO2016/133066
PCT Pub. Date: Aug. 25, 2016

(65) Prior Publication Data
US 2018/0048620 A1    Feb. 15, 2018

(30) Foreign Application Priority Data
Feb. 17, 2015  (JP) .................. 2015-028743

(51) Int. Cl.
H04L 29/12    (2006.01)
H04L 29/06    (2006.01)
H04L 29/08    (2006.01)

(52) U.S. Cl.
CPC ...... *H04L 61/1511* (2013.01); *H04L 61/2007* (2013.01); *H04L 63/0236* (2013.01);
(Continued)

(58) Field of Classification Search
CPC .............. H04L 29/12066; H04L 45/02; H04L 61/1511; H04L 61/2007; H04L 61/6059;
(Continued)

(56) References Cited

U.S. PATENT DOCUMENTS 6,748,437 B1 * 6/2004 Mankude ................ H04L 29/06
709/219
7,574,508 B1 * 8/2009 Kommula ......... H04L 29/12066
709/226

(Continued)

FOREIGN PATENT DOCUMENTS

JP    7-210570 A    8/1995
JP    2014-230139 A    1/2014

OTHER PUBLICATIONS

Kazumichi Sato, et al., "Measuring Network Traffic by Using DNS Response Data" The Institute of Electronics, Information and Communication Engineers (IEICE), 2012, 6 Pages (with English translation).

(Continued)

*Primary Examiner* — Christopher Biagini
(74) *Attorney, Agent, or Firm* — Oblon, McClelland, Maier & Neustadt, L.L.P.

(57) ABSTRACT

A name identification device includes a generation unit configured to generate graph information in which each node represents one of names and IP addresses included in
(Continued)

A records and CNAME records included in a DNS response observed in a network, and each edge represents a correspondence relationship between one and another of the names and the IP addresses in the A records and the CNAME records, and to associate the generated graph information with a client corresponding to the DNS response; and an identifying unit configured to identify a name related to a leaf node that is reachable from a node corresponding to the IP address of a server by tracing the edges in the graph information having been associated with the client, for a packet between the client and the server that is observed in the network.

7 Claims, 9 Drawing Sheets

(52) U.S. Cl.
CPC .......... *H04L 67/22* (2013.01); *H04L 67/2819* (2013.01); *H04L 61/6059* (2013.01); *H04L 61/6068* (2013.01)

(58) Field of Classification Search
CPC . H04L 61/6068; H04L 63/0236; H04L 67/02; H04L 67/1002; H04L 67/22; H04L 67/2819
See application file for complete search history.

(56) References Cited

U.S. PATENT DOCUMENTS

| | | | | |
|---|---|---|---|---|
| 8,521,880 | B1* | 8/2013 | Richardson | G06F 15/17306 705/500 |
| 8,595,262 | B1* | 11/2013 | Hayden | G06F 16/2471 707/798 |
| 2004/0194102 | A1* | 9/2004 | Neerdaels | H04L 29/06 718/100 |
| 2010/0138910 | A1 | 6/2010 | Aldor et al. | |
| 2012/0087255 | A1* | 4/2012 | Ukita | H04L 12/4625 370/252 |
| 2012/0220261 | A1* | 8/2012 | Grefen | H04L 43/0876 455/406 |
| 2015/0304199 | A1* | 10/2015 | Leask | H04L 43/0876 709/224 |

OTHER PUBLICATIONS

I. Bermudez, et al. "DNS to the Rescue: Discerning Content and Services in a Tangled Web", in Proceedings of the 2012 ACM Conference on Internet Measurement Conference, (2012), 14 pages.
International Search Report dated Apr. 26, 2016 in PCT/JP2016/054384 filed Feb. 16, 2016.

* cited by examiner

NAME IDENTIFICATION DEVICE, NAME IDENTIFICATION METHOD, AND RECORDING MEDIUM

TECHNICAL FIELD

The present invention relates to a name identification device, a name identification method, and a recording medium.

BACKGROUND ART

Communication service providers measure network traffic and itemize communication types, to use the traffic and types for operational management. Here, the "communication type" is a notion that covers not only a protocol type distinguishable by a port number such as SMTP (Simple Mail Transfer Protocol) and HTTP (HyperText Transfer Protocol), but also various types of services implemented on HTTP such as YouTube (registered trademark) and LINE. The type of a service can be inferred from a host name that is described in a URL (Uniform Resource Locator) of an HTTP header, for example, "youtube.com" or "line.me".

In recent years, however, many HTTP flows are encrypted by SSL (Secure Socket Layer)/TLS (Transport Layer Security); thereby observing information in the HTTP header including the URL has become difficult. Also, in CDN (Contents Delivery Network) services that are spreading, it is often the case that a host name obtained by reversely looking up with the IP address of a server represents CDN service providers, such as e566.dspe1.akamaiedge.net, which cannot be used for identifying the service.

Thereupon, in Non-patent document 1, a technology is disclosed that makes use of an operation of a client before starting a communication, which converts a host name into an IP address, so as to obtain the IP address of the client and the IP address of a server in an encrypted flow, and to infer the host name from the DNS response corresponding to the encrypted flow. This technology is assumed to be used by a communication service provider, and is based on an assumption that although all communications executed by a client pass through the communication service provider, the communication service provider cannot grasp contents of an encrypted flow.

Non-patent document 1 will be described in more detail. Here, C represents a set of IP addresses of clients; S represents a set of IP addresses of servers; and N represents a set of host names of the servers.

A DNS query transmitted by a client requests a server IP address s in S corresponding to a name n in the set of N. A DNS response as the answer includes an A record denoted by "n→s", in which n in the set of N is associated with s in the set of S; and a CNAME record denoted by "n'→n", in which n is associated with an alias n' in the set of N.

FIG. 1 is a diagram illustrating an example of a DNS query and a DNS response. FIG. 1 illustrates a DNS query q1 and a DNS response r1 corresponding to the DNS query q1. In the DNS query q1, the object of name resolution is "www.ieee.org". The DNS response r1 includes two A records and two CNAME records. In the example of the DNS response r1, the included A records correspond to respective aliases of "www.ieee.org" being the object of the name resolution. Note that seconds in the parentheses of each record represents the expiration time of the record.

The technology of Non-patent document 1 monitors DNS responses so as to manage each pair of a client c in the set of C and a server s in the set of S associated with a solved name n in the set of N (CxS→N). In the example in FIG. 1, assuming that the IP address of the client is 1.1.1.1, the following two correspondence relationships are stored: (1.1.1.1, 23.2.132.181)→www.ieee.org; and (1.1.1.1, 23.10.1.125)→www.ieee.org.

When an encrypted flow is observed, the service is identified by a host name that is included in the header of the encrypted flow, and that has been associated with a pair of the IP address of a client and the IP address of a server.

RELATED ART DOCUMENTS

Non-Patent Documents

Non-patent document 1: I. N. Bermudez, M. Mellia, M. M. Munafo, R. Keralapura, and A. Nucci, "DNS to the rescue: Discerning content and services in a tangled web", in Proceedings of the 2012 ACM Conference on Internet Measurement Conference, ser. IMC'12, 2012, pp. 413-426.

SUMMARY OF INVENTION

Problem to be Solved by the Invention

The technology of Non-patent document 1 manages only a latest host name for each pair of the IP address of a client and the IP address of a server. However, since a DNS response may be cached for later use, a host name to which a latest query has been made is not necessarily correct. Also, in a CDN service, a CNAME (an alias) such as "e566.dspe1.akamaiedge.net" may be used, and an inquiry for the name may be issued. In such a case, it is difficult to identify the service by a value (CNAME) stored as the host name.

This point will be described specifically. Upon receiving a DNS response relating to a certain name, a client caches the DNS response. Then, when going to communicate again with the destination having the name, the client searches for the IP address corresponding to the name with reference to the cached DNS response without transmitting a DNS query. However, since the A records and CNAME records have respective expiration times, a DNS query is transmitted if a record required for searching has expired.

In FIG. 1, since the expiration time of the A records is the shortest, the A records expire first among the records included in the DNS response r1. In this case, the client transmits a DNS query with respect to a name (an alias) "e.1630.c.akamaiedge.net", not with respect to the original name "www.ieee.org". The response to this query includes only an A record in which "e.1630.c.akamaiedge.net" is associated with the IP address.

Since the technology of Non-patent document 1 manages only a latest response, the following correspondence relationships are to be stored in this case: (1.1.1.1, 23.2.132.181)→e.1630.c.akamaiedge.net; and (1.1.1.1, 23.10.1.125)→e.1630.c.akamaiedge.net. Then, the host name to be inferred for an encrypted flow related to (1.1.1.1, 23.2.132.181) or (1.1.1.1, 23.10.1.125) is "e.1630.c.akamaiedge.net", which is not "www.ieee.org" representing the type of the service.

In view of the above, it is an object of the present invention to raise accuracy of an inference of a host name in the case of executing name resolution using an alias.

Means for Solving the Problem

In order to solve the above problem, a name identification device includes a generation unit configured to generate graph information in which each node represents one of names and IP addresses included in A records and CNAME records included in a DNS response observed in a network, and each edge represents a correspondence relationship between one and another of the names and the IP addresses in the A records and the CNAME records, and to associate the generated graph information with a client corresponding to the DNS response; and an identifying unit configured to identify a name related to a leaf node that is reachable from a node corresponding to the IP address of a server by tracing the edges in the graph information having been associated with the client, for a packet between the client and the server that is observed in the network.

Advantage of the Invention

It is possible to raise accuracy of an inference of a host name in the case of executing name resolution using an alias.

EMBODIMENTS OF THE INVENTION

Figure 2:
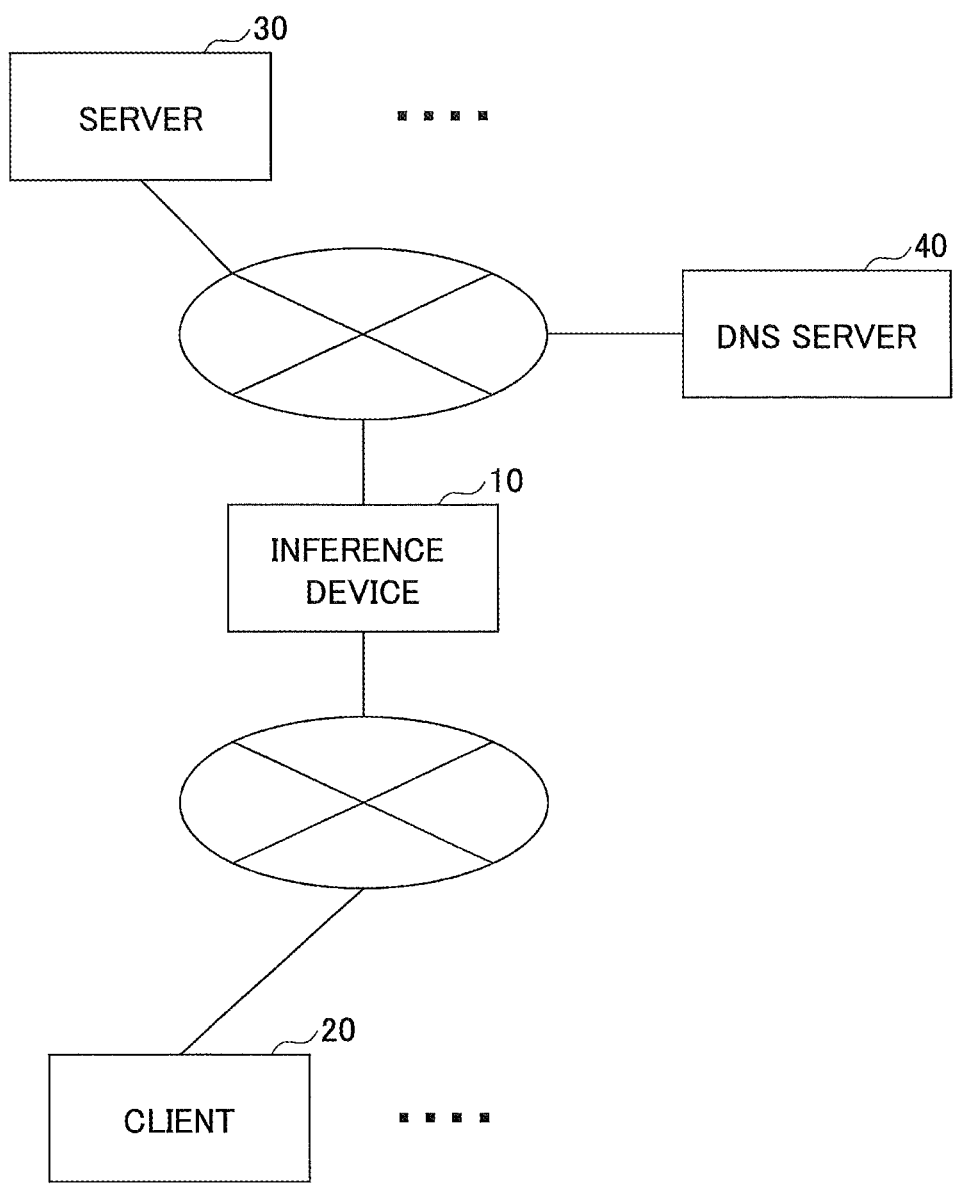
FIG. 2 is a diagram illustrating an example of a network configuration according to an embodiment of the present invention.

In the following, embodiments of the present invention will be described with reference to the drawings. FIG. 2 is a diagram illustrating an example of a network configuration according to an embodiment of the present invention. In FIG. 2, one or more clients 20 can communicate with one or more servers 30 and DNS (Domain Name System) servers 40 via a network such as a LAN (Local Area Network) and the Internet. Also, an inference device 10 is connected to the network so as to be capable of observing communication between each client 20 and each server 30, and communication between each client 20 and each DNS server 40.

Each client 20 is a computer that transmits a request for a service provided by a server 30. Each server 30 is a computer that executes a process related to a service requested by a client 20. For example, servers 30 may be a Web server.

The DNS server 40 is a generic DNS server. In the present embodiment, the DNS server 40 returns to a client 20 a DNS response including an IP address corresponding to a host name or a domain name ("host name" will be used uniformly, below) specified in a DNS query from the client 20.

The inference device 10 is constituted with one or more computers that observe or monitor ("observe" will be used uniformly, below) a DNS response from the DNS server 40 related to the DNS query from the client 20, and based on the observed DNS response, infers an identifier of a service related to packets (for example, IP (Internet Protocol) packets) to be exchanged between the client 20 and the server 30. Here, an "identifier of a service related to packets" is an identifier of a service related to a request or a response related to the packets (which will be referred to as the "service name", below). In general, the host name differs from service to service. Therefore, in the present embodiment, the host name of a server 30 is used as an example of the service name. The inference device 10 may be operated by a communication service provider, for example, an ISP (Internet Service Provider).

Figure 3:
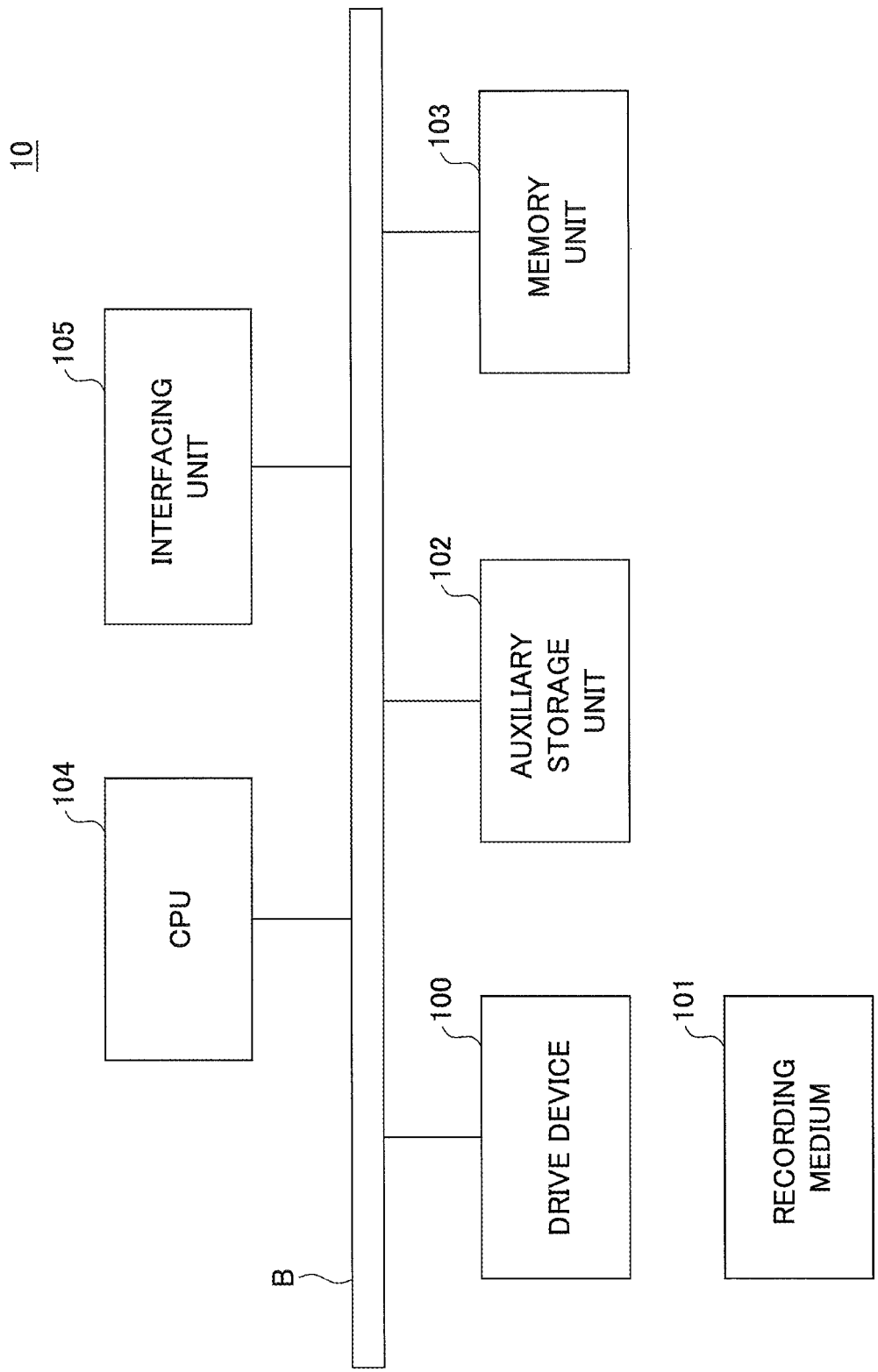
FIG. 3 is a diagram illustrating an example of a hardware configuration of an inference device according to an embodiment of the present invention.

FIG. 3 is a diagram illustrating an example of a hardware configuration of the inference device according to the embodiment of the present invention. The inference device 10 in FIG. 3 includes a drive device 100, an auxiliary storage unit 102, a memory unit 103, a CPU 104, and an interface unit 105, which are mutually connected by a bus B.

A program that implements processing on the inference device 10 is provided with a recording medium 101 such as a CD-ROM. When the recording medium 101 storing the program is set in the drive unit 100, the program is installed into the auxiliary storage unit 102 from the recording medium 101 via the drive unit 100. However, installation of the program is not necessarily executed from the recording medium 101, but may also be downloaded from another computer via the network. The auxiliary storage unit 102 stores the installed program, and stores required files, data, and the like as well.

Upon receiving a command to activate the program, the memory unit 103 reads the program from the auxiliary storage unit 102, to load the program. The CPU 104 executes functions relevant to the inference device 10 according to the program stored in the memory unit 103. The interface unit 105 is used as an interface for connecting to a network.

Figure 4:
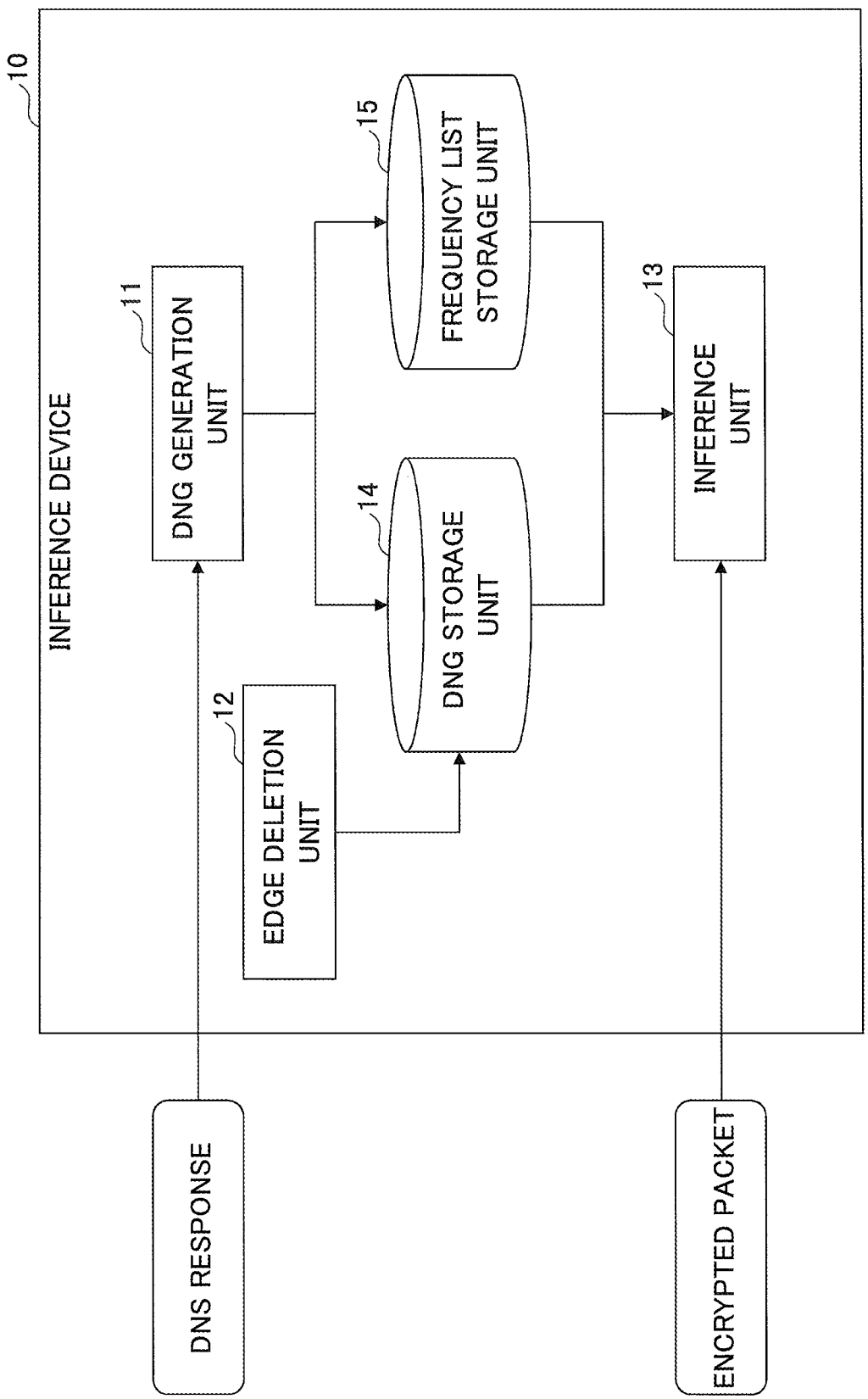
FIG. 4 is a diagram illustrating an example of a functional configuration of an inference device according town embodiment of the present invention.

FIG. 4 is a diagram illustrating an example of a functional configuration of the inference device according to the embodiment of the present invention. In FIG. 4, the inference device 10 includes a DNG generation unit 11, an edge deletion unit 12, and an inference unit 13. These units are implemented by processes that one or more programs installed in the inference device 10 cause the CPU 104 to execute. The inference device 10 also uses a DNG storage unit 14 and a frequency list storage unit 15. These storage units can be implemented by using the auxiliary storage unit 102, a memory unit that can be connected to the inference device 10, or the like.

The DNG generation unit 11 observes a DNS response from the DNS server 40, to generate graph information in which nodes represent names (host names or aliases) and IP addresses included in A records and CNAME records included in the observed DNS response, and edges represent correspondence relationships of the names and the IP addresses in the A records and the CNAME records. In the following, the graph information will be referred to as a "DNG" (a domain name graph). The generated DNG is associated with the IP address of the client 20 being the source of the DNS query corresponding to the DNS response, and stored in the DNG storage unit 14.

Figure 5:
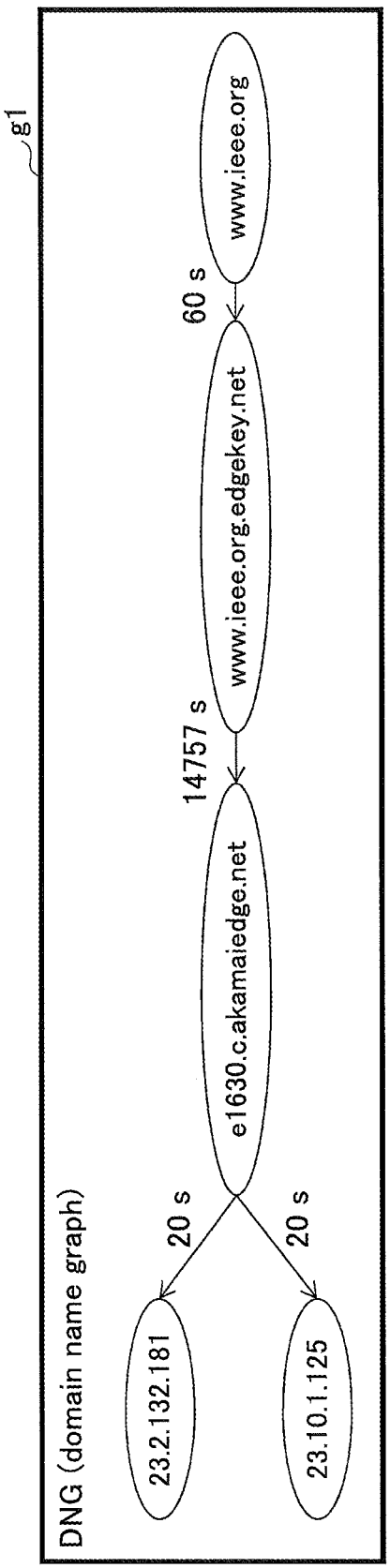
FIG. 5 is a diagram illustrating an example of a DNG.

FIG. 5 is a diagram illustrating an example of a DNG. The graph g1 illustrated in FIG. 5 is a DNG that is generated based on the DNS response r1 illustrated in FIG. 1. In other words, each node in the graph g1 corresponds to a name (a host name or an alias) or an IP address included in an A record or a CNAME record in the DNS response r1. Also, each edge in the graph g1 corresponds to a correspondence relationship between these names and the IP addresses. Note that each edge has a direction corresponding to the direction of the reference of the correspondence relationship. However, each edge does not need to be a directed edge.

Also, each edge is given a term with respect to the correspondence relationship corresponding to the edge, based on the expiration time included in the DNS response r1. In FIG. 5, as a matter of convenience, the expiration times included in the DNS response r1 are given to the edges as they are; strictly, information that can identify the date and time of the expiration time is given to each edge. For example, date and time used as the starting point of the expiration time included in the DNS response r1 and the expiration time may be given, or date and time obtained by adding the expiration time to the date and time used as the starting point may be given.

Note that the structure of each DNG is updated every time a DNS response related to the client 20 corresponding to the DNG is observed.

The DNG generation unit 11 also updates a frequency list stored in the frequency list storage unit 15 in response to an observation of a DNS response. The frequency list is an associative array in which a key represents a combination (n, s) of a name n and an IP address s of a server 30, and a value represents a count of inquiries related to the combination (count of DNS queries). The frequency list is also managed for each client 20.

The edge deletion unit 12 deletes an edge that has expired among the edges constituting a DNG.

The inference unit 13 observes an encrypted packet between each client 20 and each server 30, to infer the service name related to the encrypted packet, based on a DNG corresponding to the client 20 related to the observed encrypted packet, and the frequency list corresponding to the client 20. Note that an "encrypted packet" means a packet whose payload part is encrypted. However, the present embodiment may also be applied to a packet that is not encrypted.

Figure 6:
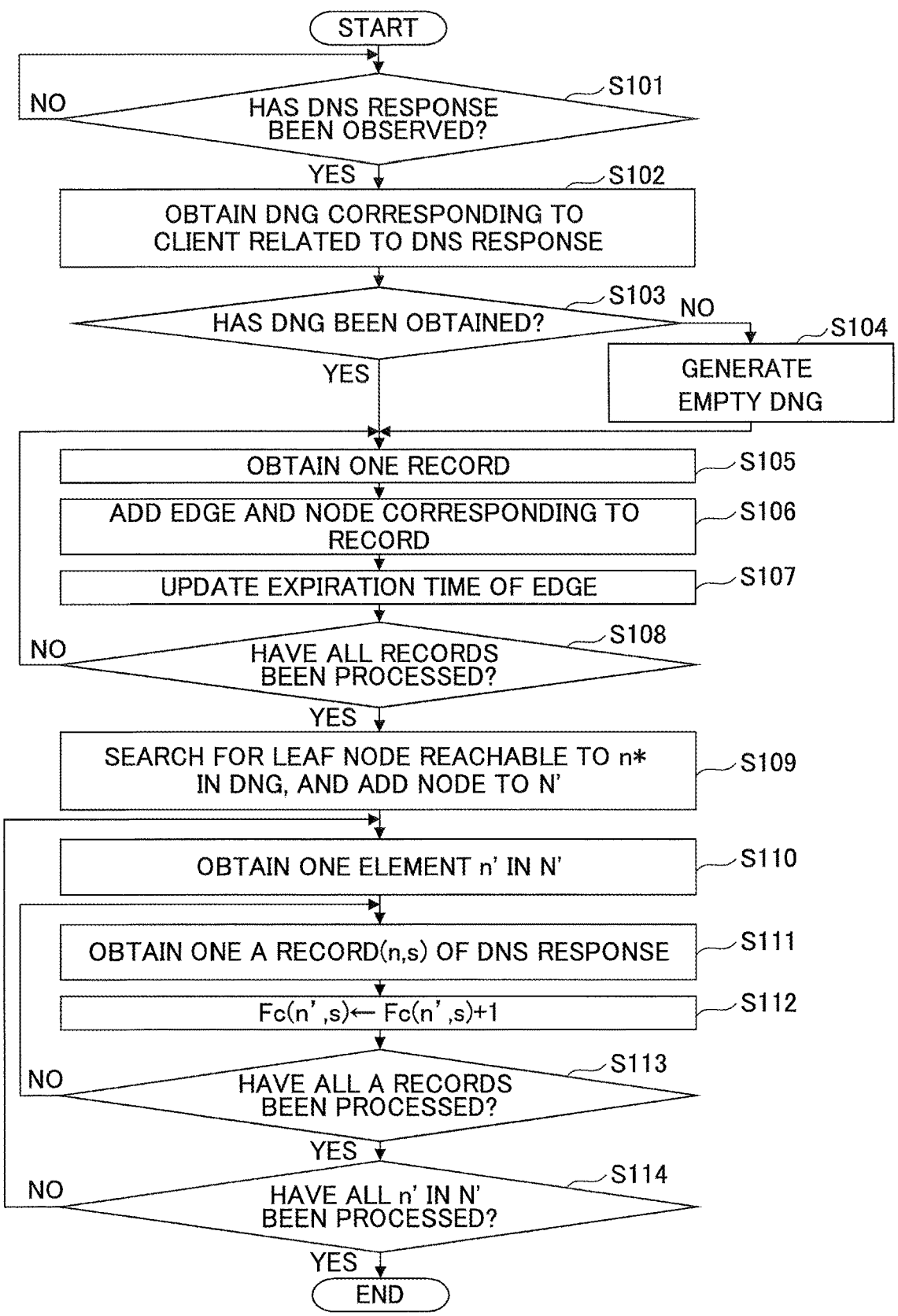
FIG. 6 is a flowchart illustrating an example of processing steps executed by an inference device when observing a DNS response.

In the following, processing steps executed by the inference device 10 will be described. FIG. 6 is a flowchart illustrating an example of processing steps executed by the inference device when observing a DNS response.

If having observed a DNS response (referred to as an "objective DNS response") on the network (YES at Step S101), the DNG generation unit 11 obtains a DNG corresponding to the client 20 (referred to as the "objective client 20") related to the objective DNS response, from the DNG storage unit 14 (Step S102). A "DNG corresponding to the objective client 20" means a DNG that is associated with the destination IP address of the packet of the objective DNS response. If the corresponding DNG has been obtained (YES at Step S103), the DNG is set as an object to be processed, and Steps S105 and after are executed. If the corresponding DNG has not been obtained (NO at Step S103), the DNG generation unit 11 newly generates a DNG corresponding to the destination IP address of the packet of the objective DNS response (Step S104). However, the content of the new DNG is empty at this time. In this case, the new DNG is set as the object to be processed, and Step S105 and after will be executed. In the following, the DNG being the object to be processed after Step S105 will be referred to as the "objective DNG".

Next, the DNG generation unit 11 obtains one of the A records and the CNAME records included in the objective DNS response (referred to as the "objective record"), as the object to be processed (Step S105). Next, the DNG generation unit 11 adds an edge and nodes corresponding to the objective record to the objective DNG (Step S106). For example, if the objective record is an A record, respective nodes for the name and the IP address included in the A record, and an edge connecting the nodes are added. Also, if the objective record is a CNAME record, respective nodes for the names included in the CNAME record, and an edge connecting the nodes are added. Note that it is not necessary to add a node or an edge that already exists. In this way, the DNG is updated every time a DNS response is observed. Note that the data structure representing a DNG is not limited to a predetermined one. For example, each node and each edge may be represented by an object or a structure. Alternatively, each node and each edge may be represented by a record in a database.

Next, the DNG generation unit 11 updates the term given to the edge corresponding to the objective record (Step S107). For example, date and time obtained by adding the expiration time included in the objective record to the present date and time are given to the edge.

Figure 1:
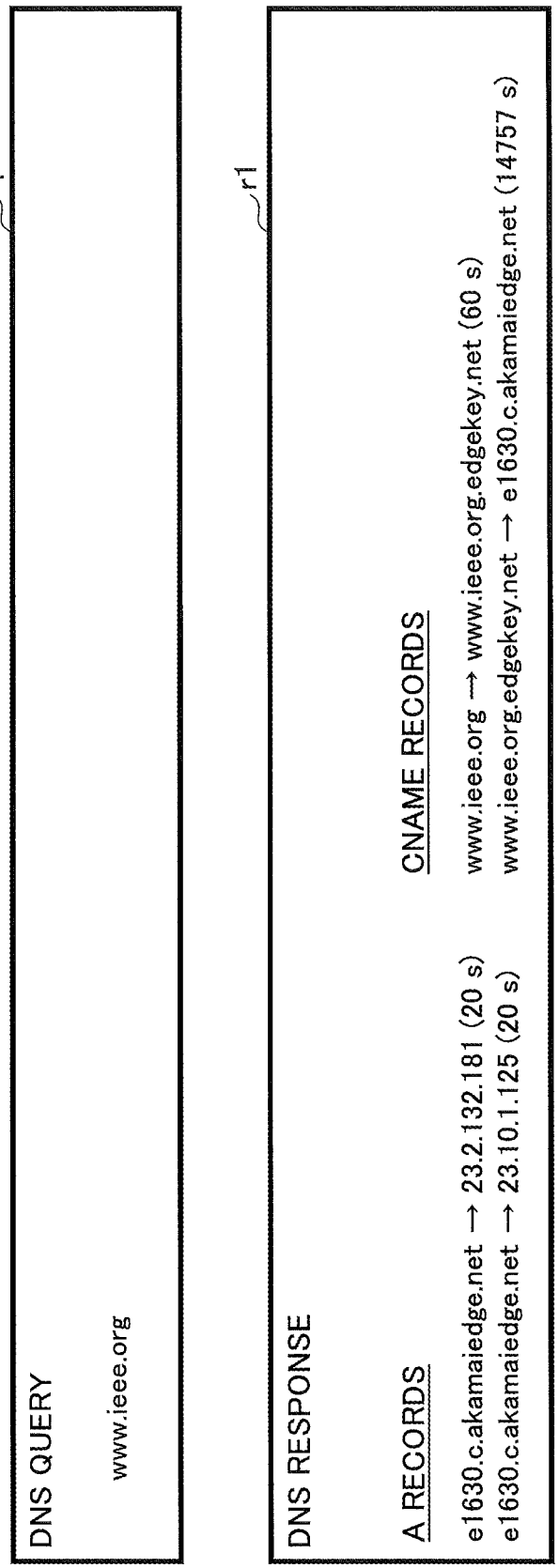
FIG. 1 is a diagram illustrating an example of a DNS query and a DNS response.

Steps S105-S107 are executed for all A records and CNAME records included in the objective DNS response (Step S108). Therefore, for example, assuming that the DNS response r1 in FIG. 1 is the objective DNS response, Steps S105-S107 are executed for each of the two A records and the two CNAME records. In this case, if the objective DNG is a new DNG, the graph g1 illustrated in FIG. 5 is generated. Note that the objective DNG generated or updated is stored in the DNG storage unit 14.

Once having completed the execution of Steps S105-S107 for all the A records and CNAME records included in the objective DNS response (YES at Step S108), the DNG generation unit 11 searches in the objective DNG for a set of leaf nodes related to respective names, which are reachable to a name n* specified in the DNS query corresponding to the objective DNS response (Step S109). The set of names related to the searched-for leaf nodes is denoted by N'. Note that although omitted in FIG. 1, the content of a DNS query is included in the DNS response in general. Therefore, based on the objective DNS response, it is possible to identify the name n* specified in the DNS query corresponding to the objective DNS response.

Here, the "leaf node related to a name" is meant to exclude a leaf node related to an IP address, although a DNG includes a leaf node related to an IP address. Also, a "leaf node reachable to a name n* specified in the DNS query" means a leaf node reachable to a node related to the name n* by tracing the edges in the objective DNG. Since there is a possibility that an alias, which is not an original name such as "e1630.c.akamaiedge.net" in FIG. 1, is specified in a DNS query, such a set of leaf nodes is searched for in order to identify the original name. Note that if the graph g1 in FIG. 5 is the objective DNG, only "www.ieee.org" is included in N'; however, depending on the structure of the objective DNG, multiple names may be included in N'.

Next, the DNG generation unit 11 obtains an element n' (that is, name n') in N' as an object to be processed (Step S110). Next, the DNG generation unit 11 obtains one of the A records in the objective DNS response, denoted by (n, s), as an object to be processed (Step S111). Here, n of (n, s) represents the name included in the A record, and s represents the IP address (that is, the IP address of one of the servers 30) included in the A record.

Next, the DNG generation unit 11 adds 1 to the value of an element having (n', s) as the key, among elements of a frequency list Fc associated with the IP address of the objective client 20, among the frequency lists stored in the frequency list storage unit 15 (Step S112). Note that the value to be added is not limited to 1. For example, depending on the number of the elements of N', the value to be added may be reduced. For example, 1/(the number of elements in N') may be used as the value to be added.

Steps S111 and S112 are executed for all the A records included in the objective DNS response (Step S113). Further, Steps S111 and S112 to be executed for all the A records are executed for each name included in N' (Step S114). Therefore, if the DNS response r1 in FIG. 1 is the objective DNS response and the graph g1 in FIG. 5 is the objective DNG, in the frequency list Fc, the value of an element having a combination of (www.ieee.org, 23.2.132.181) as the key, and the value of an element having a combination of (www.ieee.org, 23.10.1.125) as the key, are updated.

Note that in the present embodiment, the example is described in which a DNG and a frequency list are managed for each client 20; however, a single DNG may be generated for all the clients 20. Also, a single frequency list may be managed for all the clients 20. In this case, the key of the frequency list may be set to (n, s, c), instead of (n, s), where c represents the IP address of a client 20. In other words, a corresponding client 20 may be distinguished by the key of an element in the frequency list.

Figure 7:
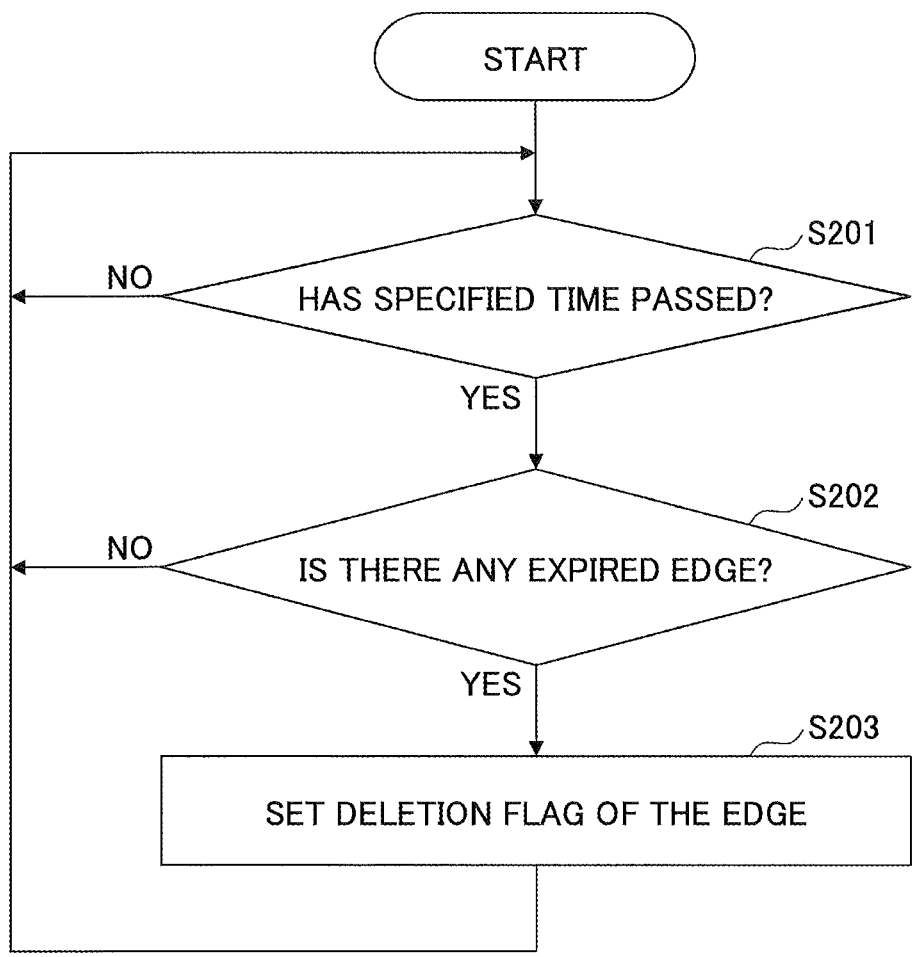
FIG. 7 is a flowchart illustrating an example of processing steps of deleting edges in a DNG.

Next, processing steps executed by the edge deletion unit 12 will be described. FIG. 7 is a flowchart illustrating an example of processing steps of deleting edges in a DNG.

For example, the edge deletion unit 12 executes Steps S202 and after at every regular interval (Step S201). At Step S202, the edge deletion unit 12 searches for an edge whose given term is before the present date and time, among the edges constituting one of the DNGs stored in the DNG storage unit 14. If a corresponding edge is found (YES at Step S202), the edge deletion unit 12 gives a deletion flag to the edge (Step S203). The deletion flag is one of the attribute information items of an edge, representing that the edge has been deleted (the expiration time of the edge has been expired). Note that the edge is not deleted completely to avoid a situation where no original name is identifiable in a process executed by the inference unit 13, which will be described later. Also, if an edge already exists that corresponds to the edge to be added at Step S106 in FIG. 6, and has the deletion flag given, the deletion flag is removed from the existing edge.

Figure 8:
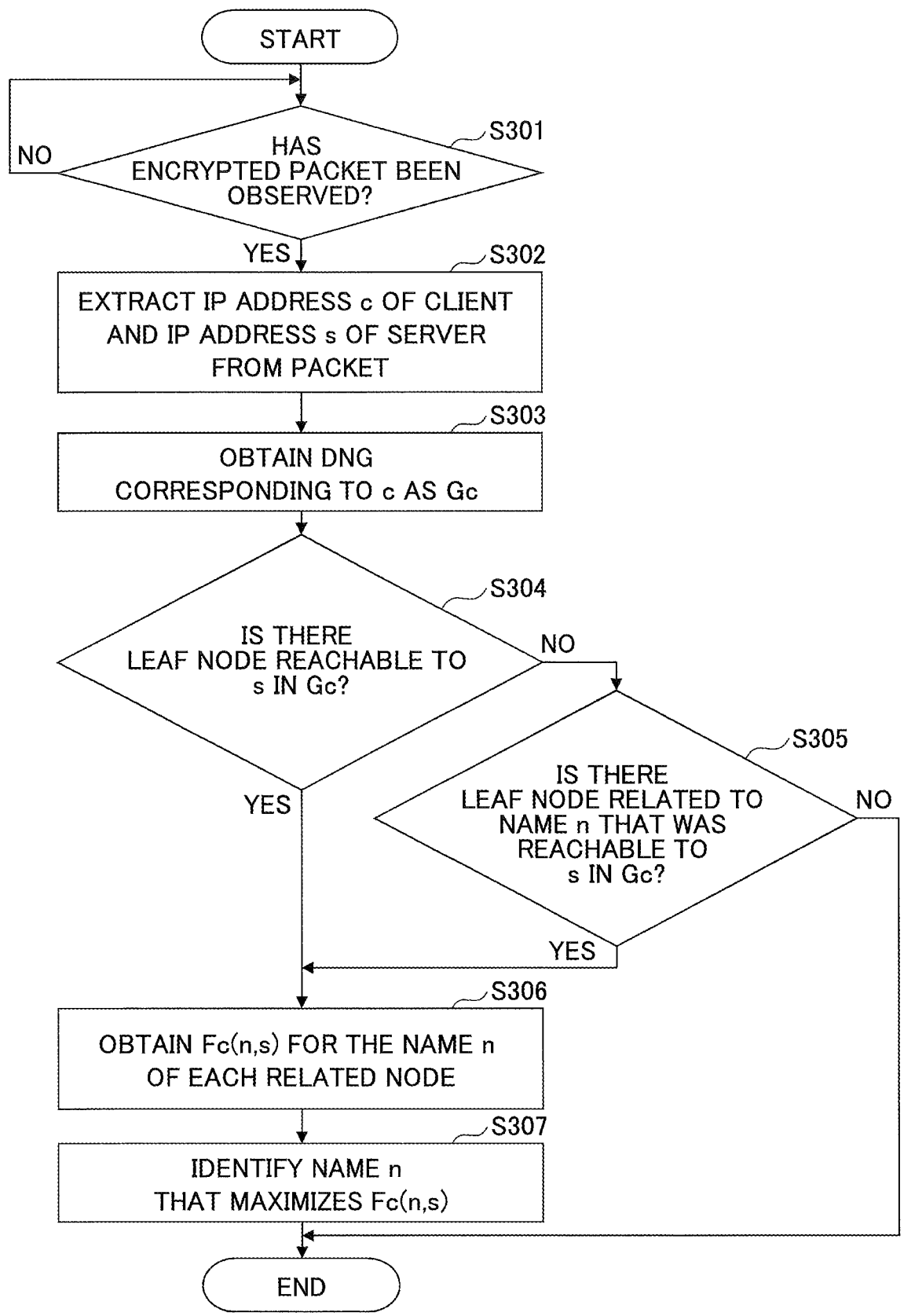
FIG. 8 is a flowchart illustrating an example of processing steps executed by an inference device when observing an encrypted packet between a client and a server.

Next, processing steps will be described that are executed when observing an encrypted packet exchanged between a client 20 and a server 30. FIG. 8 is a flowchart illustrating an example of processing steps executed by the inference device when observing an encrypted packet between a client and a server.

If having observed an encrypted packet (referred to as an "objective packet", below) on the network (YES at Step S301), the inference unit 13 extracts the IP address c of the client 20, and the IP address s of the server 30 from the header part of the objective packet (Step S302). c and s are the source (or destination) IP address and the destination (or source) IP addresses of the objective packet, respectively. If the inference device 10 is operated by an ISP or the like, the IP address of each client 20 is allocated by the ISP. In other words, the inference device 10 can retain a list of the IP addresses of the clients 20. Based on such a list, the IP address of the client 20 may be identified as one of the source IP address and the destination IP address.

Next, the inference unit 13 obtains a DNG associated with the IP address c of the client 20, from the DNG storage unit 14 (Step S303). The DNG will be referred to as the "graph Gc", below.

Next, the inference unit 13 searches for a leaf node related to a name reachable to the node of the IP address s of the server 30 in the graph Gc (Step S304). Here, a condition for the reachability is that no edge having the deletion flag given is used. Further, even if reachable only using edges not having the deletion flags given, a node is excluded from nodes to be searched for if the node is connected to an edge having the deletion flag given. In other words, only leaf nodes corresponding to the original name are to be searched for.

If one or more corresponding leaf nodes are found (YES at Step S304), the inference unit 13 obtains, for the name related to each corresponding leaf node, the value Fc (n, s) of an element having a combination (n, s) of the name n and the IP address s of the server 30 as the key in the frequency list Fc corresponding to the IP address c of the client 20 (Step S306). Next, the inference unit 13 identifies (selects) the name whose obtained value is the maximum (Step S307). In other words, the name is inferred as the service name related to the objective packet. However, top N names in terms of the obtained values may be selected. In other words, multiple names may be identified. Further, if information representing a degree of popularity for each name can be obtained additionally, weighting may be executed by the degree of popularity, to select the name. As an example of the degree of popularity, access ranking may be considered. Note that if only one corresponding leaf node is found at Step S304, the name related to the leaf node may be inferred as the service name, without executing Step S306.

On the other hand, if no corresponding leaf node is found (NO at Step S304), the inference unit 13 searches for a leaf node related to a name reachable to the node of the IP address s of the server 30 in the graph Gc (Step S305). Here, using an edge having the deletion flag given used may be permitted. If a corresponding leaf node is found (YES at Step S305), Steps S306 and S307 are executed for the leaf node. In other words, priority is given to a leaf node related to a name reachable to the node of s only through edges whose terms are not expired, over leaf nodes not as such. This is because a name related to a node reachable to the node through an edge whose term has been expired may not be valid any longer.

Note that inferred results by the inference unit 13 may be used, for example, for analyzing items of communication types for each service.

Also, in the above description, an A record may be replaced by an AAAA record. In other words, the present embodiment is applied not only for IPv4 but also for IPv6.

As described above, according to the present embodiment, a DNG is generated based on a history of DNS responses, and a service name is inferred that relates to packets, by using the DNG. The DNG includes not only a latest name but also the original name. Therefore, it is possible to raise accuracy of an inference of a host name in the case of executing name resolution using an alias.

Also, if multiple candidates exist for the name to be identified, a name having the maximum count of the name resolution is identified among the multiple candidates. In other words, a name having been used for the name resolution for the maximum number of times is identified. This means that a name that is most frequently used by the client 20 is identified. A name most frequently used by the client 20 can be considered as a name that has a high possibility of being recognized as a service name as an identifier of a certain service. Therefore, it is possible to further improve the possibility that a correct name is identified as the service name.

Also, priority is given to a leaf node related to a name reachable to the IP address s of a server 30 only through edges whose terms are not expired, over leaf nodes not as such. Therefore, it is possible to reduce a possibility that a name that has already become invalid is inferred as the service name.

Figure 9:
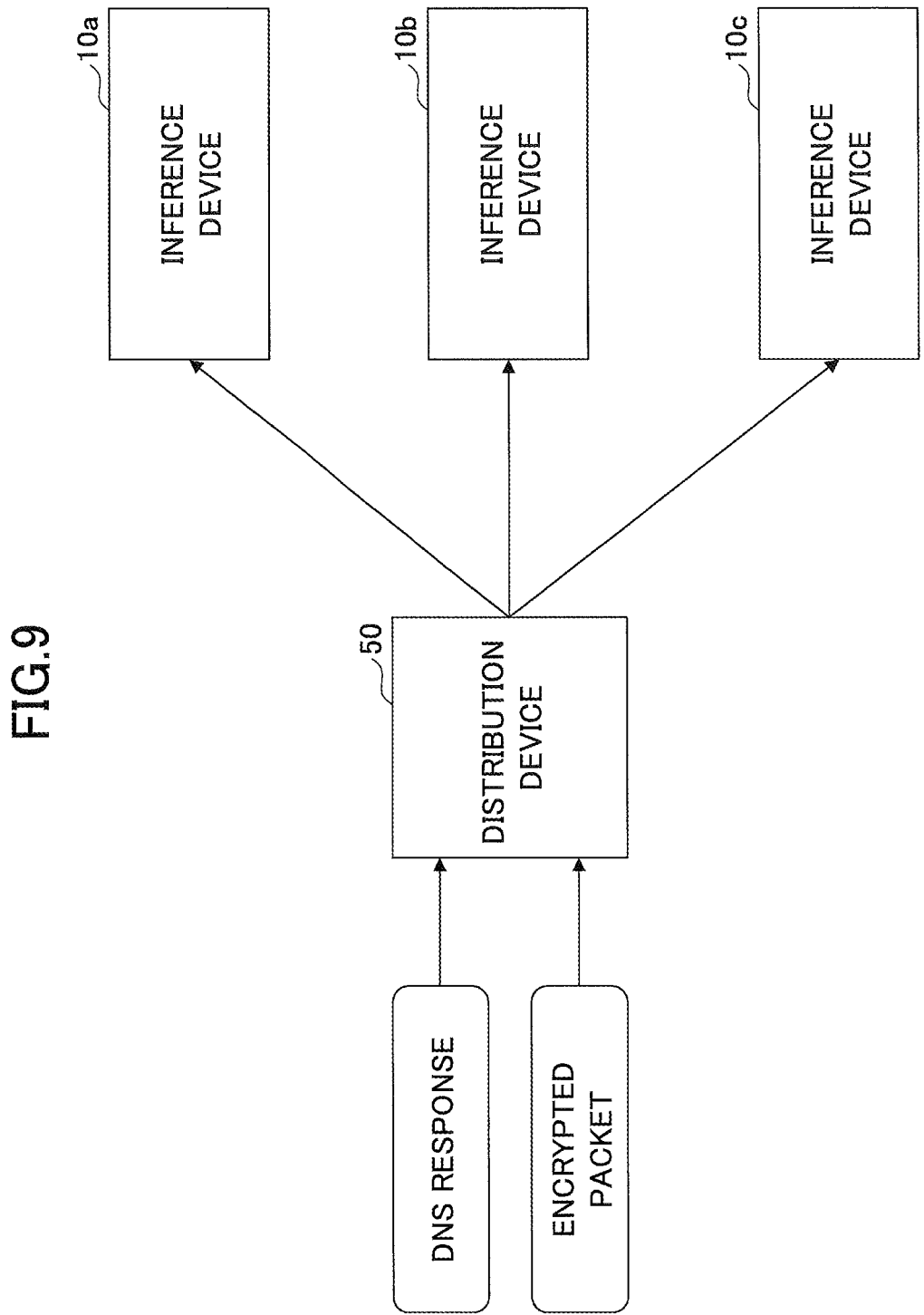
FIG. 9 is a diagram illustrating an example of a system configuration for a case in which parallel processing is executed by multiple inference devices.

Note that parallel processing may be executed by multiple inference devices 10. FIG. 9 is a diagram illustrating an example of a system configuration for a case in which parallel processing is executed by multiple inference devices.

FIG. 9 illustrates multiple inference devices 10 (an inference device 10a, an inference device 10b, and an inference device 10c). Each inference device 10 is connected to a distribution device 50, for example, via the network.

The distribution device 50 observes a DNS response from the DNS server 40, and transfers the DNS response to one of the inference devices 10 that corresponds to the client of the observed DNS response. The distribution device 50 also observes an encrypted packet between each client 20 and each server 30, and transfers the encrypted packet to one of the inference devices 10 that corresponds to the client 20 related to the observed encrypted packet.

Here, "one of the inference devices 10 that corresponds to the client" is an inference device 10 corresponding to the IP address of the client. In a DNS response, the destination IP address corresponds to the IP address of the client. The IP address of the client in an encrypted packet can be obtained by the method described above.

For example, the distribution device 50 calculates a hash value for the IP address of a client by using a hash function. The distribution device 50 distributes a DNS response or an encrypted packet to the inference device 10 corresponding to the hash value. In other words, the distribution device 50 stores correspondence information between hash values and the inference devices 10. The inference device 10 being the destination of the transfer executes the above process for the transferred DNS response or encrypted packet.

Note that a hash function is a function that has the domain of any bit sequences including IP addresses (for input), and the range of integers in a specified interval (hash values) (for output). If three computers execute parallel processing, it is possible to allocate clients to the inference devices 10 nearly evenly, by setting 1-3 as the range. As a result, the processing load can be distributed to the inference devices 10 evenly, and high-speed processing can be realized even for a large amount of traffic.

However, means other than the hash function may be used for allocating the clients to the inference devices 10. For example, a range of IP addresses of the clients may be allocated to each inference device 10, or allocation may be executed based on a result of applying another function to the IP address of the client.

Allocation based on the IP address of the client makes it possible to allocate a DNS response and an encrypted flow of a specific client to a single inference device 10. Therefore, each inference device 10 can infer a name by using a DNG for a client allocated to the inference device 10.

Note that FIG. 9 has been described with an example in which three units of the inference devices 10 are used; alternatively, two units of the inference devices 10 may be used, or four or more units of the inference devices 10 may be used. Alternatively, a single unit of the inference device 10 may have multiple DNG generation units 11 and multiple inference units 13, and may further have a functional unit corresponding to the distribution device 50 (referred to as a "distribution unit", below). In this case, the distribution unit may distribute DNS responses or encrypted packets to the DNG generation units 11 or the inference units 13. Note that as described above, the inference device 10 according to the present embodiment may be implemented by a computer and a program, and the program can be recorded on a recording medium and provided through a network.

Note that in the present embodiment, the inference device 10 is an example of a name identification device. The DNG generation unit 11 is an example of a generation unit. The inference unit 13 is an example of an identifying unit. The frequency list is an example of frequency information.

As above, the embodiments of the present invention have been described in detail. Note that the present invention is not limited to such specific embodiments, but various variations and modifications may be made within the scope of the subject matters of the present invention described in the claims.

The present patent application claims priority based on Japanese Patent Application No. 2015-028743, filed on Feb. 17, 2015, and the entire contents of the Japanese Patent Application are incorporated herein by reference.

LIST OF REFERENCE SYMBOLS 10 inference device
11 DNG generation unit
12 edge deletion unit
13 inference unit
14 DNG storage unit
15 Frequency list storage unit
20 client
30 server
40 DNS server
50 distribution device
100 drive device
101 recording medium
102 auxiliary storage unit
103 memory unit
104 CPU
105 interface unit
B Bus

The invention claimed is:

1. A name identification device, comprising:
a processor coupled to a memory and configured to
generate, from a DNS response observed in a network, graph information in which each node represents a name included in an A record or a CNAME record, or an IP address included in the A record, and each edge represents a correspondence relationship from one of the names in the A record or the CNAME record to another of the names in the A record or the CNAME record, or from one of the names of the A record or the CNAME record to an IP address of the A record or the CNAME record, and to associate the generated graph information with a client corresponding to the DNS response; and
identify a name related to a leaf node that is reachable from a node corresponding to the IP address of a server by tracing the edges in the graph information having been associated with the client, for a packet between the client and the server that is observed in the network, wherein every time a DNS response is observed, based on A records and CNAME records included in the DNS response, the processor updates the graph information associated with a client corresponding to the DNS response, and updates, for each leaf node related to a name reachable from a node corresponding to a name specified in a DNS query corresponding to the DNS response, frequency information for each combination of the name related to the leaf node and each IP address included in the A records of the DNS response, and the processor selects one leaf node among a plurality of the leaf nodes reachable from the node corresponding to the IP address of the server by tracing the edges in the graph information having been associated with the client, for a packet between the client and server that has been observed, based on the frequency information with respect to each combination of the IP address of the server and the name of each of the leaf nodes.

2. The name identification device as claimed in claim 1, wherein the processor gives a term for each of the edges of the graph information, based on an expiration time included in the DNS response with respect to a correspondence relationship corresponding to the edge, and the processor identifies the name, prioritizing a leaf node reachable without tracing an edge having expired among a plurality of leaf nodes reachable by tracing the edges from the node corresponding to the IP address of the server, in the graph information having been associated with the client, for a packet between a client and a server.

3. The name identification device as claimed in claim 1, wherein the processor performs a plurality of generations of graph information and identifications of names related to leaf nodes based on an address of the client corresponding to the DNS response or the packet.

4. A name identification method executed by a computer, the method comprising:

generating, with a processor, graph information in which each node represents one of names and IP addresses included in A records and CNAME records included in a DNS response observed in a network, and each edge represents a correspondence relationship from one of the names in the A records or the CNAME records to another of the names in the A records or the CNAME records, or from one of the names of the A records or the CNAME records to an IP address of the A records or the CNAME records, and associating the generated graph information with a client corresponding to the DNS response; and identifying, with the processor, a name related to a leaf node that is reachable from a node corresponding to the IP address of the server by tracing the edges in the graph information having been associated with the client, for a packet between the client and the server that is observed in the network, wherein every time a DNS response is observed, based on A records and CNAME records included in the DNS response, the generating updates the graph information associated with a client corresponding to the DNS response, and updates, for each leaf node related to a name reachable from a node corresponding to a name specified in a DNS query corresponding to the DNS response, frequency information for each combination of the name related to the leaf node and each IP address included in the A records of the DNS response, and the identifying selects one leaf node among a plurality of leaf nodes reachable from the node corresponding to the IP address of the server by tracing the edges in the graph information having been associated with the client, for a packet between the client and server that has been observed, based on the frequency information with respect to each combination of the IP address of the server and the name of each of the leaf nodes.

5. The name identification method as claimed in claim 4, wherein the generating gives a term for each of the edges of the graph information, based on an expiration time included in the DNS response with respect to a correspondence relationship corresponding to the edge, and the identifying identifies the name, prioritizing a leaf node reachable without tracing an edge having expired among a plurality of leaf nodes reachable by tracing the edges from the node corresponding to the IP address of the server, in the graph information having been associated with the client, for a packet between a client and a server.

6. The name identification method as claimed in claim 4, wherein the computer executes a plurality of processes of the generating and a plurality of processes of the identifying, and the method further comprises distributing the DNS response or the packet to one of the generation units or one of the identifying units, based on an address of the client corresponding to the DNS response or the packet.

7. A non-transitory computer-readable recording medium having a program stored therein for causing a computer to execute a name identification method comprising:

generating, based on a DNS response, graph information in which each node represents names included in A records, IP addresses included in A records, and CNAME records included in the DNS response observed in a network, and each edge represents a correspondence relationship from one of the names in the A records or the CNAME records to another of the names in the A records or the CNAME records, or from one of the names of the A records or the CNAME records to an IP address of the A records or the CNAME records, and associating the generated graph information with a client corresponding to the DNS response; and identifying a name related to a leaf node that is reachable from a node corresponding to the IP address of the server by tracing the edges in the graph information having been associated with the client, for a packet between the client and the server that is observed in the network, wherein every time a DNS response is observed, based on A records and CNAME records included in the DNS response, the generating updates the graph information associated with a client corresponding to the DNS response, and updates, for each leaf node related to a name reachable from a node corresponding to a name specified in a DNS query corresponding to the DNS response, frequency information for each combination of the name related to the leaf node and each IP address included in the A records of the DNS response, and the identifying selects one leaf node among a plurality of leaf nodes reachable from the node corresponding to the IP address of the server by tracing the edges in the graph information having been associated with the client, for a packet between the client and server that has been observed, based on the frequency information with respect to each combination of the IP address of the server and the name of each of the leaf nodes.

\* \* \* \* \*